US012227398B2

(12) United States Patent
Rodriguez

(10) Patent No.: US 12,227,398 B2
(45) Date of Patent: Feb. 18, 2025

(54) DRIVE GEAR ASSEMBLY WITH PREDETERMINED OVERLOAD PROTECTION

(71) Applicant: Southwire Company, LLC, Carrollton, GA (US)

(72) Inventor: Peter Rodriguez, The Woodlands, TX (US)

(73) Assignee: Southwire Company, LLC, Carrollton, GA (US)

( * ) Notice: Subject to any disclaimer, the term of this patent is extended or adjusted under 35 U.S.C. 154(b) by 0 days.

(21) Appl. No.: 17/901,917

(22) Filed: Sep. 2, 2022

(65) Prior Publication Data

US 2023/0077274 A1 Mar. 9, 2023

Related U.S. Application Data

(60) Provisional application No. 63/240,563, filed on Sep. 3, 2021.

(51) Int. Cl.
*B66D 1/14* (2006.01)
*B66D 1/58* (2006.01)

(52) U.S. Cl.
CPC ................. *B66D 1/14* (2013.01); *B66D 1/58* (2013.01)

(58) Field of Classification Search
CPC .................................... B66D 1/14; B66D 1/58
See application file for complete search history.

(56) References Cited

U.S. PATENT DOCUMENTS 3,964,425 A * 6/1976 Septor, Sr. ........... B65H 75/425 242/390.8
4,023,744 A 5/1977 Shutt
7,614,459 B2 11/2009 Campbell et al.
8,192,126 B1 6/2012 Young
8,789,654 B2 7/2014 Campbell et al.
9,187,301 B2 11/2015 Watson et al.
9,505,596 B2 11/2016 Campbell et al.
9,878,889 B2 1/2018 Watson et al.
2007/0200104 A1* 8/2007 Davis ....................... B66D 1/14 254/342

(Continued)

FOREIGN PATENT DOCUMENTS

AU 83569 82 11/1982
DK 22 58 481 5/1974
GB 2 591 155 7/2021

OTHER PUBLICATIONS

Extended European Search Report EP 22193712.1, Feb. 8, 2023, 12 pages.

(Continued)

*Primary Examiner* — Sang K Kim
*Assistant Examiner* — Nathaniel L Adams
(74) *Attorney, Agent, or Firm* — Merchant & Gould P.C.

(57) ABSTRACT

Disclosed herein are winches comprising an overload protection mechanism. Certain aspects can comprise a drive gear frictionally coupled to a driven gear. Winch assemblies disclosed herein also can be configured to connect to common power tools such as may allow a user to operate the winch without specific training or knowledge of the application to which the winch is applied, without concern for damaging the tool within which the winch is applied. Material lifts, for instance, are contemplated herein as comprising the disclosed winches.

18 Claims, 3 Drawing Sheets

(56) References Cited

U.S. PATENT DOCUMENTS

| | | | | |
|---|---|---|---|---|
| 2010/0187488 | A1* | 7/2010 | Gargaro, III | B66D 1/12 254/362 |
| 2011/0062273 | A1* | 3/2011 | Guyard | B66D 5/22 242/396.5 |
| 2012/0181492 | A1* | 7/2012 | Matos | B66D 1/12 254/323 |
| 2016/0340159 | A1 | 11/2016 | Maghsoodi et al. | |

OTHER PUBLICATIONS

European Patent Office Action EP 22193712.1, Mar. 7, 2024, 5 pages.

* cited by examiner

DRIVE GEAR ASSEMBLY WITH PREDETERMINED OVERLOAD PROTECTION

CROSS-REFERENCE TO RELATED APPLICATION

This application claims priority to U.S. Provisional Application Ser. No. 63/240,563, filed Sep. 3, 2021, which is hereby incorporated by reference in its entirety.

BACKGROUND

Winches operated by universal attachment to cordless drill are known and provide a convenient source of power to operate winching machinery. For instance, material lifts may be repeatedly advanced and retracted using a cordless drill. Use of cordless drill coupled with the mechanical advantage of the winch can interfere with the user's ability to obtain feedback from the material lift, and untrained or inexperienced users may operate the winch beyond the capacity of the material lift. Winch overload protections are known, but require user intervention or displacement of the driveshaft from position within the gear assembly to decouple force applied at the input drive shaft to rotation of the driven gear.

Winches incorporating an overload protection mechanism having a predetermined maximum load would therefore be beneficial to prevent damage caused by advancing the winch against an overloaded capacity.

SUMMARY

Disclosed herein are winches comprising a drive gear, a drive shaft positioned within the drive gear, and an overload protector configured to selectively couple a drive gear torque to the drive shaft when the drive gear torque is less than or equal to a predetermined maximum drive gear output torque. In certain aspects, winches can further comprise driven gears operably connected to the drive shaft. Material lifts and other machinery incorporating the winches are also disclosed herein.

DETAILED DESCRIPTION

Figure 1:
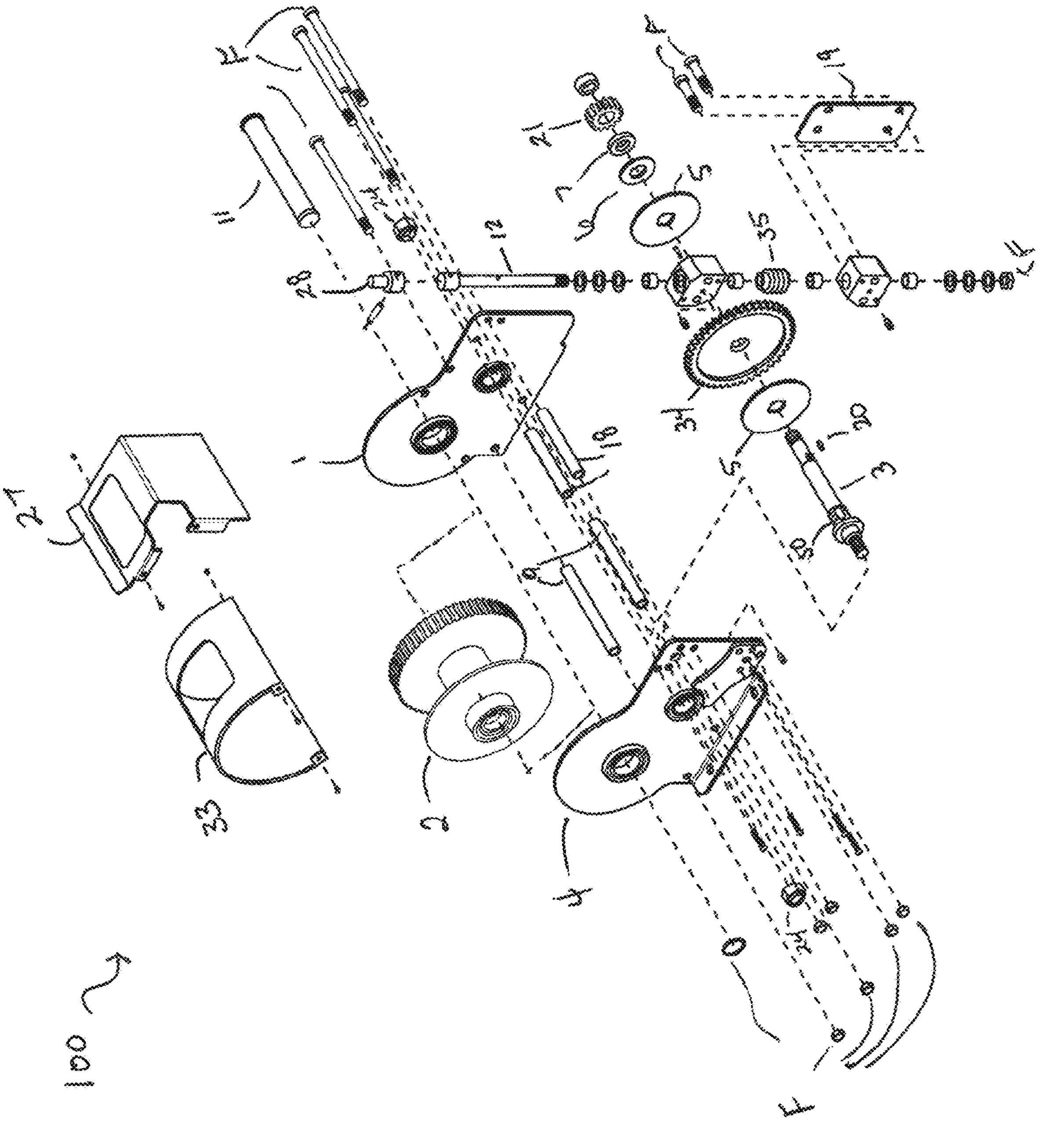
FIG. 1 depicts an exploded view of an embodiment of a winch disclosed herein.

Winches are disclosed herein as comprising an overload protection mechanism present between the drive gear and the driven gear. The drive gear generally can be associated with an input torque applied directly or indirectly to the gear, and ultimately causing the driven gear to advance or retract against a load. In certain aspects additional gears may be present between the driven gear and drive gear, and can be considered idler gears that alternate the direction of the rotation of the driven gear and assist with positioning of the gears within the winch.

The nature of the drive gear is not limited to any particular size, form, or gearing ratio and can take any form suitable for its purpose within the winch of accepting an input torque and transferring the torque to the driven gear. In certain aspects, the drive gear can be a spur gear, a helical gear, a herringbone gear, a bevel gear, a face gear, or a worm gear. In aspects where the drive gear is a worm gear, the drive gear can comprise a bore worm connected to an input drive shaft, the input drive shaft configured to receive a torque from a power tool. In certain aspects, the power tool may be a corded or cordless drill, a torque wrench, right angle drill, or similar power tool able to attach to the input drive shaft. Significantly, overload protectors disclosed herein may prevent damage to the machinery components even where power tools having large excess of torque are used to drive the input drive shaft. The bore worm can be connected to the worm gear. The driven gear also may be any suitable gear capable of interacting with the drive shaft to receive the output torque from the driven gear.

In certain aspects, the winches contemplated herein may further comprise an idler gear positioned between the drive gear and driven gear to change direction of the applied torque or position of components. Indeed, practically any arrangement of components to receive the torque from the drive gear via the drive shaft is contemplated herein. In certain aspects, the driven gear can be operably connected with a load drum that further allows securing load cables to the drum, where the load cables may ultimately be advanced or retracted about the drum, by application of the input torque to the drive gear within the predetermined maximum input torque.

In certain aspects, the drive gear can have a gear ratio in a range from 5:1 to 300:1, or from 10:1 to 100:1, 25:1 to 100:1, or from 20:50. In such aspects, the drive gear can multiply an input torque applied by the user, for instance by cordless drill, according to the gear ratio of the drive gear. Where a cordless drill is employed, the input torque can be applied across a range of 0 ft. lbs. of torque to a maximum of 30 ft lbs, 50 ft lbs, 80 ft lbs, 100 ft lbs, 150 ft lbs, 200 ft lbs, or 250 ft. lbs. of torque. Accordingly, operation with cordless drills having a maximum torque in a range from 20 to 200 ft lbs, or from 10 to 100 ft lbs are also contemplated herein. Such ranges are common for cordless drills, and may coordinate with any gear ratio described above. Thus, in certain aspects, it is contemplated herein that the input torque may be 250 ft lbs, and the torque output from the drive gear and applied to the driven gear, e.g., the output torque, can theoretically be 75,000 ft. lbs assuming a 100% gear efficiency.

Such extreme torque forces clearly have the ability to damage components associated with the winch, particularly by inexperienced technicians using power tools that can obscure the haptic feedback during operation that might otherwise signal damage or failure of components receiving force from the winch, including tow cables, pulley systems, housing panels, fastener mounts, and even the structure to which the winch is secured. Certain aspects disclosed herein are able to prevent failure and damage from torque overload by including a torque limiting overload protector between the drive gear and the driven gear.

In certain aspects, the torque limiting overload protector can comprise a friction disk arranged in adjacent contact with the drive gear, resulting in a frictional force between the friction disk and the drive gear. When the frictional force exceeds the output torque received from the drive gear (e.g., drive gear torque), the friction disk remains securely positioned against the drive gear, rotating in synchronous manner with the drive gear. The friction disk can be rotationally fixed to a drive shaft, allowing the output torque to be transferred from the drive gear to the friction disk, and ultimately to a drive shaft connected in operation to the driven gear. It will be seen that the drive gear arranged in this manner is able to complete transfer and amplification of an input torque to the driven gear, when within a predetermined capacity of the winch.

Alternatively, when the output torque exceeds the frictional force applied between the friction disk and drive gear (e.g., the frictional force is less than or equal to the output torque), the rotation of the drive gear becomes uncoupled from the rotation of the friction disk, and ultimately uncoupled from the driven gear. Thus, where the output torque exceeds a predetermined capacity, the friction disk will remain stationary, or rotate about the drive shaft to which the friction disk is secured at least partially independent from the drive gear. In this manner, it will be understood that the overload protection may be achieved by the drive shaft becoming disengaged with the drive gear by allowing the friction disk to slide against the face of the drive gear, without displacing any component of the winch. Thus, no displacement of winch components is required to achieve the selective engagement and disengagement of the output torque to the driven gear. Further, no user interference is required to activate the selective engagement and disengagement. Rather, the process is configured to operate automatically at a predetermined maximum output torque.

Those of skill in the art will understand that the capacity of the winch can be predetermined by adjusting the frictional force applied between the friction disk and the drive gear. In certain aspects, the frictional force may be increased by applying an axial force relative to the drive shaft and rotational axis of the drive gear, against the friction disk. In such aspects, the friction disk will be pressed against the drive gear and result in a frictional force generally proportional to the axial force applied to the friction disk. In this manner, the frictional force can be controlled by adjusting the axial force applied to the friction disk. In certain aspects, the axial force may be applied by advancing a threaded bearing lock nut along mating threadings present on the drive shaft. A spring washer (e.g., Belleville washer) may also be included between the lock nut and the friction disk to ensure fine adjustment is possible and avoid inconsistencies in the applied axial force in the absence of a spring washer.

In certain aspects, the lock nut may be advanced axially along the drift shaft until a torque in a range from 1 ft lb. to 100 ft lbs, from 5 ft lbs to 50 ft lbs, or any range therebetween that corresponds to an axial force applied to the friction disk, further corresponding to a desired predetermined maximum output torque. The predetermined maximum output torque may be further correlated to a predetermined maximum input torque according to the gear ratio of the drive gear, and expected gear efficiency. Accordingly, in certain aspects, the predetermined maximum output torque can be adjusted to an amount less than 75,000 ft lbs, or in a range from 500 to 50,000 ft lbs, 500 to 25,000 ft lbs, 500 to 10,000 ft lbs, or 500 to 5,000 ft lbs. In certain aspects, the predetermined maximum input torque can be in a range from 5 to 50 ft lbs, from 10 to 100 ft lbs, or from 20 to 250 ft lbs.

The friction disk can have any form and construction suitable for receiving the axial force, applying a frictional force to the drive gear, and transferring the output torque to a drive shaft, and driven gear. In certain aspects, a peripheral edge of friction disk can approximate the profile of the drive gear in order to maximize surface area contact between the friction disk and the drive gear. In certain aspects the friction disk can have a round or circular peripheral edge. The friction disk may be secured about the drive shaft at a portion that is not round, to prevent the drive shaft from rotating independently from the friction disk. Thus, in certain aspects, the friction disk may have an centrally placed aperture to receive the drive shaft, where the drive shaft and aperture are both other than round (e.g., square). Composition of the friction disk is also not limited, and may be any construction that is sufficiently durable to receive and transfer the output torque, and also provides a sufficient coefficient of friction to the drive gear such that excessive axial forces are not required to achieve a desired frictional force, but not such a high coefficient of friction so as to prevent the friction disk from predictably disengaging the drive gear. Friction disks contemplated herein can comprise metals (e.g. brass), ceramics, polymers, and combinations thereof.

Certain aspects may comprise multiple friction disks, for instance, where a friction disk is present on each side of a drive gear. In such aspects, as presented in FIG. 1, the friction disks may each be held in place by the fastener applying an axial force to one frictional disk and against a second fastener at the opposing end of the drive shaft. In this manner, the drive gear can be sandwiched between the two friction disks and maximize the contact between friction disks and the drive gear. Arrangement of the overload protector in this manner can lead to increased ability to tune the overload protection to a desired maximum output torque, reduce wear in parts and improve the repeatability of the engagement and disengagement over time.

Winches disclosed herein may receive an input torque applied to the drive gear by any suitable means. In certain aspects, winches can comprise a hand crank to turn the drive gear, the hand crank comprising any dimensions (e.g., diameter) suitable for the intended purpose. Winches disclosed herein may be particularly useful where drive gears are adapted to accommodate an input torque from power tools, such as a cordless drill. In certain aspects, the drive gear can be operably connected to an input drive shaft, the input drive shaft configured to be driven by a standard cordless drill. In certain aspects the input drive shaft can comprise a hex shank or a common bolt fitting able to be secured within a cordless drill or universal drill attachment.

Winches contemplated herein may further comprise any additional components common to winches generally, and include supports, housings, frame panels, attachments for securing the winch to other devices or supports, and the like.

Figure 2:
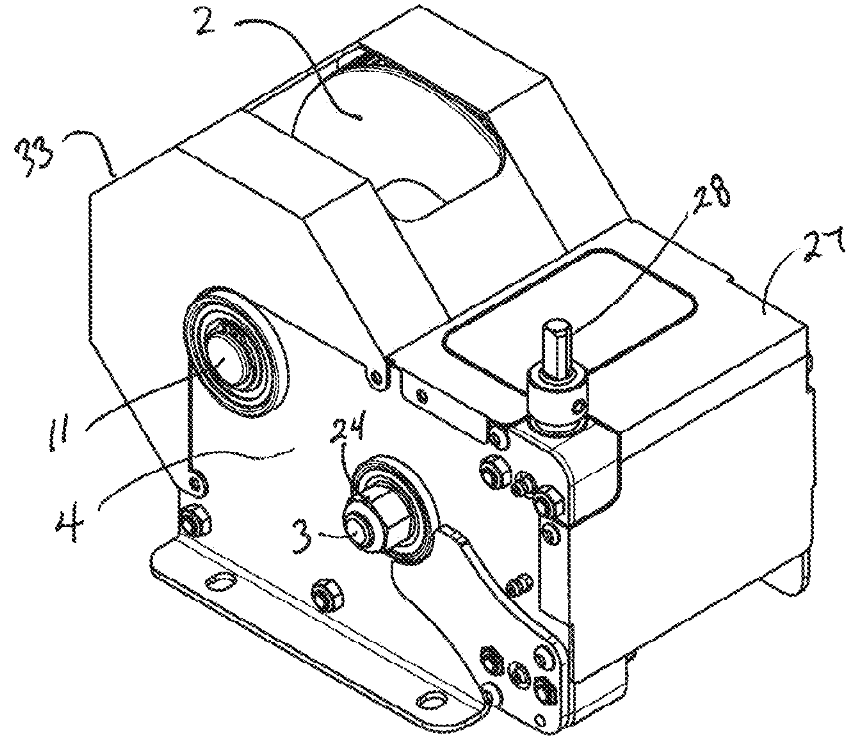
FIG. 2 depicts a perspective view of the winch shown in FIG. 1.
Figure 3:
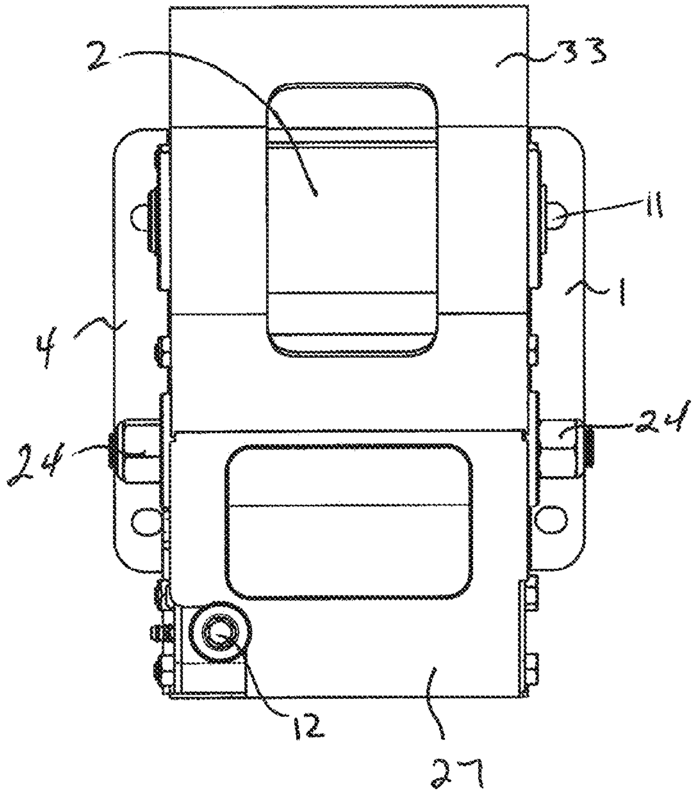
FIG. 3 depicts a top view the winch shown in FIG. 1.

FIGS. 1-3 depict an embodiment of a winch as disclosed herein. As seen in FIG. 1, winch 100 comprises worm gear 34 and associated bore worm 35 are incorporated as the drive gear for the winch. Worm drive shaft 12 connects the bore worm 35 to drill adapter 28 for connection to a cordless drill as discussed above. Upon receiving the input torque from the cordless drill, worm drive shaft 12 transfers torque from the drill, to bore worm 35, to worm gear 34, and ultimately across drive shaft 3 when engaged the drive gear. Plate 19 is secured to the enclose worm gear components between against frame panel 4. Drive shaft 3 further secures idler gear 21 in rotationally fixed manner by the inclusion of woodruff key 20 within drive shaft 3 and extending into idler gear 21. Thus, idler gear 21 rotates with drive shaft 3. Idler gear 21 also mates with load drum 2 comprising the driven gear. Load drum 2 is supported by and rotates about load axle 11. Several additional fasteners F are provided to retain each of the components described above in a secure operating position.

Figure 4:
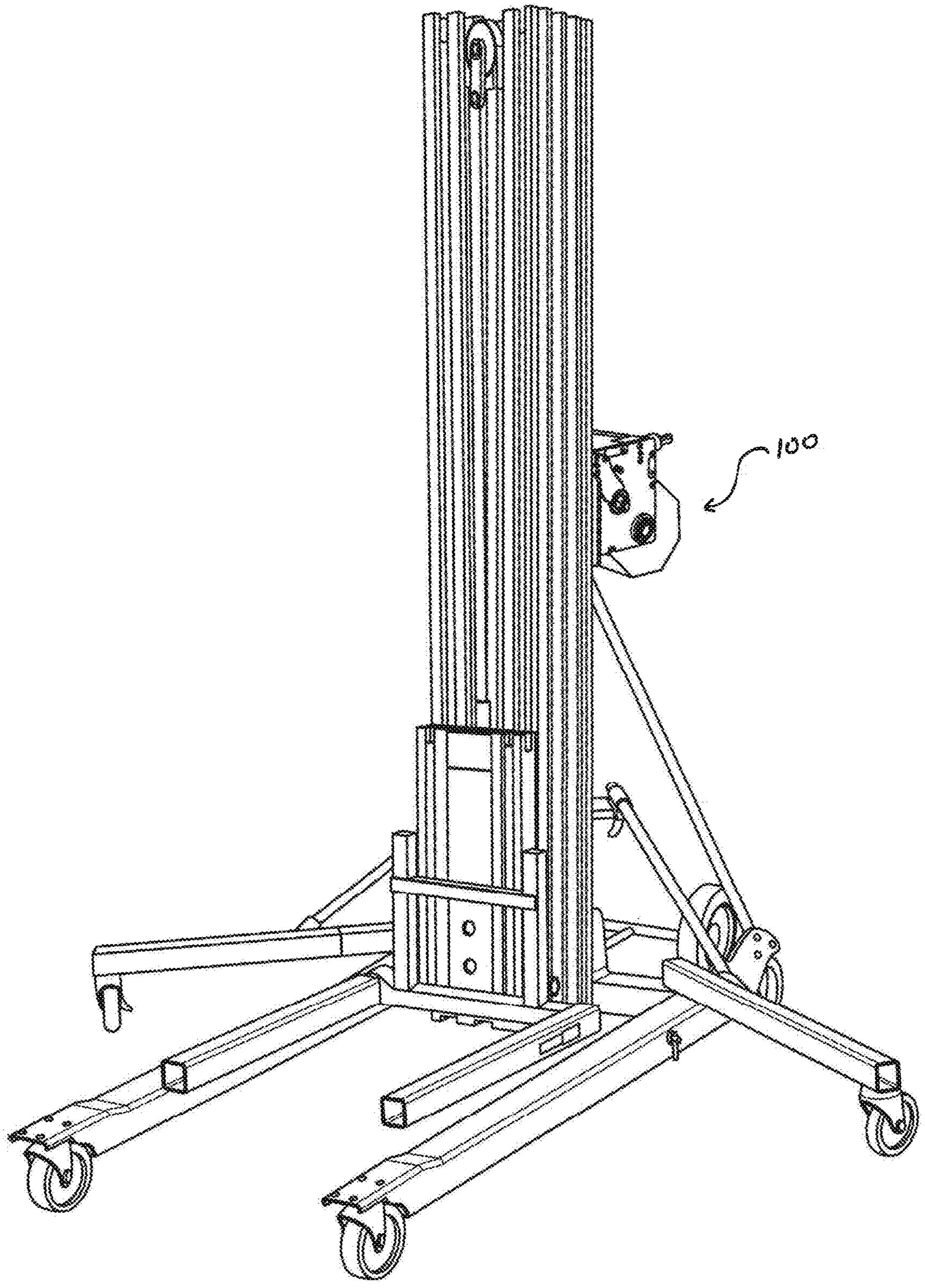
FIG. 4 depicts an embodiment of a material lift incorporating the winch of FIGS. 1-3.

Overload protection is achieved along the worm gear 34, by the application of axial force along drive shaft 3 advancing internal threadings of lock nut 7 along threaded portion 50 of drive shaft 3. Axial force created by lock nut 7 is distributed by spring washer 6 and ultimately applied to brass friction disks 5 positioned on either side of worm gear 34. Each of friction disks 5 comprises a square aperture in the center that seats on a square portion of drive shaft 3. Drive shaft 3 is positioned through frame panels 1 and 4, and fasteners 24 retain the drive shaft and supported components discussed above in position. Spreader bars 9 and 18 are present to maintain proper distance between frame panels 1 and 4 and provide dimensional support to the winch. Additional housing elements 33 and 27 are secured to the frame panels, allowing the winch to be operated as an independent unit as shown in FIGS. 2-3, or incorporated within a dedicated machinery, such as a Sumnerx Series 2000/2100 material lift. FIG. 4 depicts an embodiment of a material lift comprising winch 100.

When winches as disclosed herein are incorporated into a material lift as shown in FIG. 4, or for instance a Sumner® Series 2000 or 2100 material lift, the overload protector can be configured to correspond with any appropriate torque limitations of components external to the winch. In the context of a lift, the overload protection therefore prevents inexperienced users from improperly estimating the weight of a load on the lift and operating the lift outside its rated capacity. In certain aspects, the lift may have components rated for a maximum capacity of 650 lbs. In such aspects, the predetermined maximum drive gear torque of the winch can be correlated to the maximum capacity of the lift, either by calculation or trial and error. For instance, the maximum lift capacity of 650 lbs may correlate to a predetermined maximum drive gear torque of 1,000 ft lbs. As discussed above, this maximum output torque can further be correlated to the frictional force applied by the overload mechanism, and the axial force applied by the fastener. In the case of the lock nut fastener described in the embodiment depicted in FIGS. 1-3, the axial force also can be correlated to a tightening torque applied to the fastener. Surprisingly, in this manner, the tightening torque applied to a single component of the winch, the fastener, may be reliably correlated to the maximum capacity of a material lift, such that the winch can be easily tuned and applied within a wide range of applications with overload protection. Overload protection disclosed herein thereby allows the winch to be used in many applications, without concern that the winch will damage components not specifically designed to be powered by the winch. In this manner, the winches disclosed herein can be more universally applied, and tuned to the specific application in which they are used, even where the end user is inexperienced.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A winch comprising:

a bore worm coupled to a worm gear;

an input drive shaft attached to the bore worm;

a protected drive shaft; and an overload protector comprising:

a friction disk rotationally fixed to the protected drive shaft; and a fastener applying an axial force to the friction disk in the direction of the worm gear causing the friction disk to contact the worm gear;

wherein:

the overload protector is configured to couple to the worm gear when the torque is less than or equal to a predetermined maximum worm gear torque; and the overload protector is configured to disengage from the worm gear when the worm gear torque is greater than the predetermined maximum worm gear torque.

2. The winch of claim 1, wherein the overload protector is configured to disengage the worm gear without translational displacement of any component of the winch.

3. The winch of claim 1, wherein the axial force results in a frictional force between the friction disk and the worm gear, such that when the torque is less than or equal to the frictional force, the torque is transferred to the protected drive shaft by the rotation of the friction disk, and when the torque exceeds the frictional force, the torque causes the worm gear to rotate about the protected drive shaft at least partially independent from rotation of the friction disk and the protected drive shaft.

4. The winch of claim 1, wherein the overload protector further comprises a second friction disk rotationally fixed to the protected drive shaft, the second friction disk contacting an opposite face of the worm gear as the first friction disk.

5. The winch of claim 1, wherein the predetermined maximum worm gear torque corresponds to a predetermined maximum input torque in a range from 10 to 100 ft-lbs.

6. The winch of claim 1, wherein the predetermined maximum worm gear torque corresponds to a predetermined maximum input torque in a range from 25 to 50 ft-lbs.

7. The winch of claim 1, wherein the fastener comprises a spring washer and a bearing lock nut.

8. The winch of claim 1, wherein the fastener is secured to the protected drive shaft with a tightening torque in a range from 2 ft-lbs to 50 ft-lbs.

9. The winch of claim 1, wherein the input drive shaft is configured to be driven by a drill.

10. The winch of claim 9, wherein the input drive shaft comprises a hex-shank drill attachment.

11. The winch of claim 9, wherein the drill has a maximum torque in a range from 20 to 200 ft. lbs.

12. The winch of claim 1, further comprising a load drum connected to an idler gear rotationally fixed to the protected drive shaft.

13. The winch of claim 12, further comprising a load cable secured to the load drum.

14. The winch of claim 1, wherein the worm gear and bore worm have a gear ratio in a range from 5:1 to 300:1.

15. The winch of claim 1, wherein the worm gear and the bore worm have a gear ratio in a range from 20:1 to 50:1.

16. A material lift comprising the winch of claim 1.

17. The material lift of claim 16, wherein the predetermined maximum worm gear torque corresponds to a rated lift capacity in a range from 500 lbs to 2,500 lbs.

18. The material lift of claim 16, wherein the predetermined maximum worm gear torque corresponds to a maximum load rating in a range from 500 to 1,500 lbs.

* * * * *